United States Patent [19]
McGale

[11] Patent Number: 5,142,936
[45] Date of Patent: Sep. 1, 1992

[54] APPARATUS FOR DYNAMICAL BALANCING OF ROTATING OBJECTS AND METHOD FOR MAKING SAME

[76] Inventor: Peter J. McGale, P.O. Box 309, Fort Macleod, Alberta, Canada

[21] Appl. No.: 828,500

[22] Filed: Jan. 31, 1992

[51] Int. Cl.⁵ .............................................. F16F 15/22
[52] U.S. Cl. ................................ 74/573 F; 301/5 BA
[58] Field of Search ................... 74/573 F; 301/5 BA

[56] References Cited

U.S. PATENT DOCUMENTS

| | | |
|---|---|---|
| 3,006,690 | 10/1961 | Pierce . |
| 3,316,021 | 4/1967 | Salathiel . |
| 3,346,303 | 10/1967 | Wesley . |
| 3,376,075 | 4/1968 | Mitchell . |
| 3,733,923 | 5/1973 | Goodrich . |
| 3,799,619 | 3/1974 | LaBarber . |
| 3,913,980 | 10/1975 | Cobb . |
| 3,953,074 | 4/1976 | Cox . |
| 4,269,451 | 5/1981 | Narang . |
| 4,674,356 | 6/1987 | Kilgore . |

FOREIGN PATENT DOCUMENTS 1480756  5/1969  Fed. Rep. of Germany ... 301/5 BA

OTHER PUBLICATIONS

"Self Compensating Balancing . . . ", Design News, Apr. 28, 1965.
KinetiDyne lit., Fall 1989.
Dynamic Auto . . . lit., no date.

*Primary Examiner*—Dirk Wright
*Attorney, Agent, or Firm*—David R. Black

[57] ABSTRACT

This invention relates to an apparatus for dynamically and constantly balancing rotating objects while they are in motion. Such an apparatus can be applied to balancing wheels of automobiles or trucks or can be applied to balancing the shafts of rotating machinery. The basic concept is to attach a fixture that supports a system of weights to the rotating object. Said weights are free to move relative to the rotating object in an orbit concentric to the axis of rotation of said rotating object. Under the influence of the forces generated by rotation of the rotating object above its critical speed, the system of weights take a configuration that opposes and partially cancels the imbalance of the rotating object. This invention also relates to a method of making the inventive apparatus by concentrically placing the annular hoop on the mounting fixture and fixing the hoop in place by use of counter-rotating, high-speed rotary press.

40 Claims, 4 Drawing Sheets

APPARATUS FOR DYNAMICAL BALANCING OF ROTATING OBJECTS AND METHOD FOR MAKING SAME

BACKGROUND OF INVENTION

This invention relates to an apparatus for dynamically balancing rotating objects while they are in motion and a method for making the inventive apparatus. The inventive apparatus can be used to balance wheels of vehicles or shafts of rotating machinery. A mounting fixture that supports counterbalancing weights is attached to a rotating object. The weights in the apparatus are free to move relative to the rotating object in an orbit concentric to the axis of rotation of said rotating object. Under the influence of the forces generated by rotation of the rotating object above its critical speed, the weights take a configuration that oppose and partially cancel the imbalance of the rotating object; this results in less undesired vibration.

Dynamic balancing of rotating objects is known in the prior art. Reference is made to the following patents and publications: U.S. Pat. Nos. 3,164,413 to Salathiel, 3,316,021 to Salathiel, 3,346,303 to Wesley, 3,376,075 to Mitchell, 3,733,923 to Goodrich, 3,799,619 to LaBarber, 3,913,980 to Cobb, 3,953,074 to Cox, and 4,674,356 Kilgore describe inventions used to dynamically balance rotating objects, usually vehicle wheels.

U.S. Pat. Nos. 3,164,413 and 3,316,021 to Salathiel describe a hollow annular hoop containing a plurality of the spherical weights and a damping fluid. In use, the hoop is attached to a rotating wheel perpendicular to the axis of rotation of the wheel and concentric to the axis of rotation. The weights are free to move within the hoop. The damping fluid reduces noise as well as restricts the free movement of the weights. The weights are urged toward the point in the hoop which offsets the imbalance of the wheel. The annular hoop is made of a plastic material. The apparatus in the Salathiel patents has the disadvantage of using a deformable material for the annular hoop. Under conditions of rotation at high speed, the hoop can bulge where it is free to move. This loss of concentricity causes an imbalance to the device. Loss of concentricity of the hoop can also prevent free movement of the weights.

U.S. Pat. No. 3,346,303 to Wesley describes a hollow annular hoop containing a plurality of spherical weights and a measured amount of damping fluid. Wesley provides a hoop with an apex at the outer perimeter of the hoop. The hoop is adapted with the outer apex to provide reduced areas of contact between the spherical weights used and the hoop when the hoop is rotated. A damping fluid is also used in the Wesley patent. The hoop is constructed of a metal formed or welded into the proper shape or configuration. The hoop is attached to the wheel of a vehicle by use of the existing lug nuts on the wheel. The hoop is attached to a mounting fixture which has several precut lug nut holes adapted to fit a wheel.

U.S. Pat. No. 3,376,075 to Mitchell describes a dynamic wheel balancer which has a hollow annular hoop with a plurality of spherical weights and a damping fluid. The hoop is attached to a mounting fixture which is adapted to fit a variety of wheel and lug nut configurations. The annular hoop is constructed by attaching a U-shaped channel onto a plate in a fluid tight manner.

U.S. Pat. No. 3,733,923 to Goodrich describes a balancer for rotating masses which uses an annular hoop, spherical weights and a damping fluid. The hoop is a continuous metallic chase containing carbon steel balls in a damping fluid. The hoop contains a small section on the interior portion which is removed for adding the weights and the fluid.

U.S. Pat. No. 3,799,619 to LaBarber describes a vibration dampening assembly which comprises an annular hoop and spherical weights within the hoop. The outer perimeter of the hoop wall has deformable material placed thereon to assist in retaining the spherical weights in position after they have been distributed by the rotating of the hoop.

U.S. Pat. No. 3,913,980 to Cobb for a dynamic wheel balancing apparatus discloses a annular hoop with spherical weights which is placed around a wheel inside a tire of a vehicle. The invention uses non-metallic weights and a damping fluid. The hoop is made of an elastic material which can deform in use at high rotational speeds.

U.S. Pat. No. 3,953,074 to Cox discloses an annular hoop made of an aluminum outer hoop and short segments of flexible tubing placed inside the outer hoop. A plurality of spherical weights are set inside the hoops. The segments of flexible tubing are allowed to move within the outer hoop during rotation of the device. The weights are sized to move freely inside the inner bore of the flexible tubing. Both the weights and the flexible tubing are free to move with the rotation of the device, thus balancing an imbalanced wheel.

U.S. Pat. No. 4,674,356 to Kilgore describes a dynamic rotational Counterbalance Structure adapted to rotating object. A cylindrical body with an outer groove is disclosed. The outer groove is sized to accept a plurality of spherical weights. A band is fitted around the groove. A Damping fluid is also introduced into the enclosed channel with the weights. In use, the device is fitted to a rotating object where the damped weights offset imbalances in the rotating object.

The publication DESIGN NEWS described the concept of "Self-Compensating Balancing in Rotating Mechanisms", in an article dated Apr. 28, 1965. Four requirements for successful application of the method for self compensating balancing are described. First, there must be inertial forces on the rotating shaft that cause the mass center to misalign with the rotation center of the support bearings. Second, the rotating part must operate above its critical speed (i.e., the speed at which the shaft resonants and deflections are maximum). Third, the bearings must have resiliency. Fourth, the rotor must be sufficiently balanced to avoid damage to itself as it passes through critical speed during startup. An intuitive description of the underlying phenomena is also given.

The prior art does not provide a practical and effective apparatus for realizing the benefits of dynamical balancing for many possible applications. The art fails to provide a design with the required precision and durability at a cost commensurate with the benefits.

SUMMARY OF INVENTION

My invention is a balancing mechanism including a two-layer annular hoop that contains a plurality of spherical weights and a quantity of damping fluid, and means for attaching said hoop to a rotating object that is to be balanced. The balancing mechanism is attached to the rotating object.

During operation (at rotational speeds above the critical speed of the object to be balanced) the spherical weights within the balancing mechanism take positions inside the annular hoop that counteract the inherent imbalance of the rotating object.

The two-layer construction of the annular hoop is critical to achieving desirable operating characteristics and durability. An outer layer of the hoop must be rigid to allow for satisfactory connection of the device to a rotating object. The outer layer of the hoop must retain the circular, concentric shape in order to insure unimpeded movement of the weights. The outer layer of the hoop must also be resistant to corrosion and erosion. The inner layer of the hoop must be inert to the spherical weights and the damping fluid. The damping fluid must possess sufficient damping ability to suppress free movement of the weights, noise and vibration induced by the movement of the spherical weights. In practice, said damping fluid, in combination with said weights, fills from one-fourth to three-fourths of the interior of said hoop.

Great care is taken to insure that the hoop is placed dead center on a mounting fixture which can then be attached to dead center of a vehicle wheel. The outer perimeter of the mounting fixture is formed to wrap around the hoop. This wrap around effect of the mounting fixture forms a dish which increases the precision and the effectiveness of the device.

OBJECTS

An object of this invention is to provide an improved dynamic, balancing apparatus for balancing rotating objects while they are in motion and to thereby reduce the vibration of these objects and increase the operating precision and effectiveness of these objects and components linked to these objects.

Another object of this invention is to provide an improved dynamic balancing apparatus for balancing the shafts of rotating machinery thereby reducing the strength required to support these shafts and increasing the operating precision and effectiveness of the machinery.

Another object of this invention is to provide an improved dynamic balancing apparatus for balancing the wheels of vehicles thereby improving handling and ride by reducing wear on shocks, springs, steering components and mountings.

Another object is to provide an improved dynamic balancing apparatus which can operate effectively and continuously, without maintenance for long periods of time.

Another object of this invention is to provide a dynamic balancing apparatus which can withstand extreme temperature changes, solar rays, corrosive chemicals, mechanical shock and vibration as well as operate consistently at any altitude above or below sea level.

Another object of this invention is to provide an easy to use improved dynamic balancing apparatus which can easily be mounted to existing automobile and truck wheels without modification of the wheels.

Another object of the invention is to provide an improved balancing apparatus which can provide greater safety due to longer tire life, greater stability in cornering and braking, and reducing the potential for hydroplaning.

Another object of this invention is to provide an improved dynamic balancing apparatus which can be manufactured with precision and economy.

Another object of this invention is to provide a process for fabricating an improved dynamic balancing apparatus with precision and economy.

Other objects and advantages of this invention will become apparent from the following description taken in conjunction with the accompanying drawings wherein are set forth, by way of illustration and example, certain embodiments of this invention.

DETAILED DESCRIPTION OF INVENTION

Figure 1:
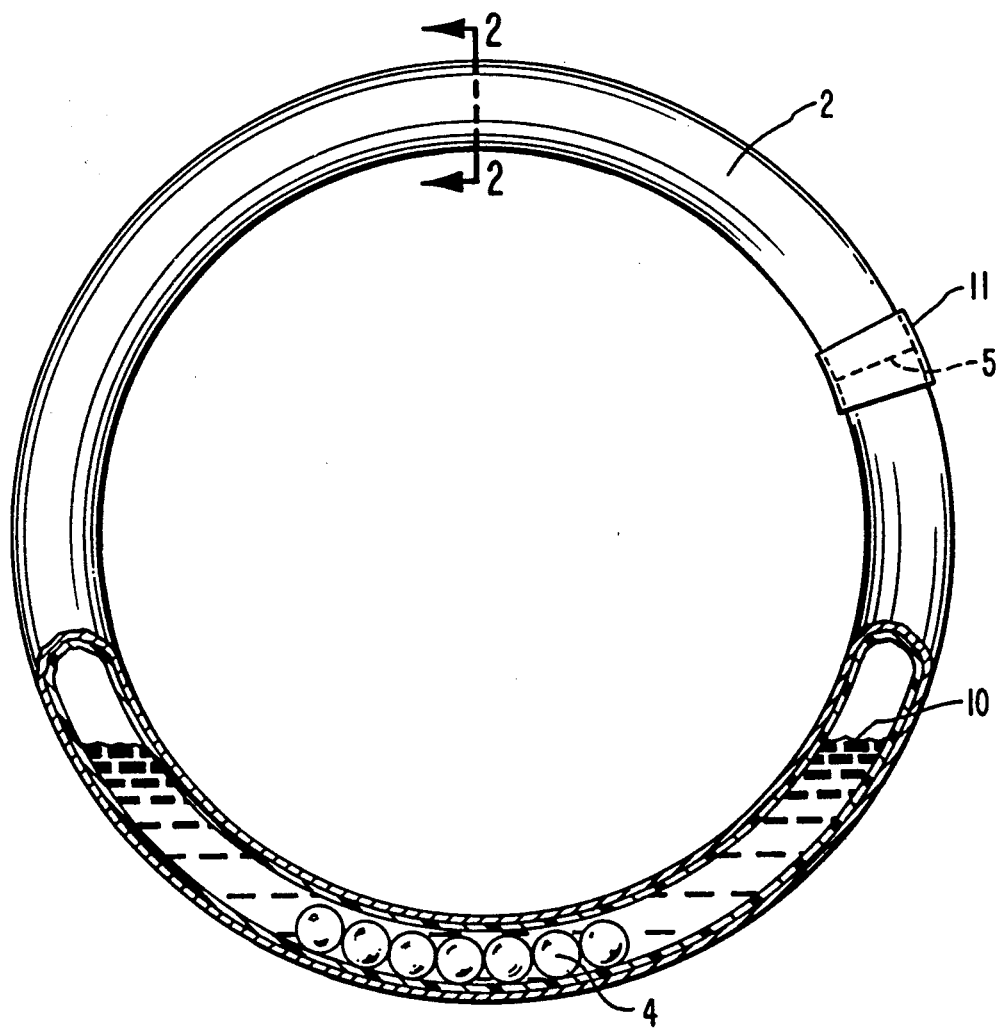
FIG. 1 depicts an annular balancing hoop.
Figure 2:
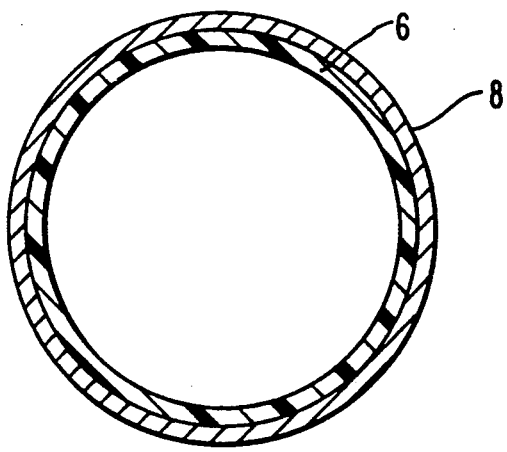
FIG. 2 depicts a cross sectional view of a two layered annular balancing hoop.

Referring to FIG. 1 a dynamic balancing apparatus is shown. Said dynamic balancing apparatus is comprised of a tubular hoop 2. A cross section of said hoop 2 is shown in FIG. 2. As shown in FIG. 2., hoop 2 is constructed of two layers, an inner hoop layer 6 and an outer hoop layer 8. FIG. 1 depicts the interior portion of said tubular hoop 2. Said hoop contains a plurality of spherical weights 4 and a quantity of damping fluid 10. Said tubular hoop 2 has two ends, a first end 5a and a second end 5b, which are abutted and joined to form a continuous hoop. Said ends 5a and 5b are joined together inside a hoop collar 11. Said hoop collar is used to hold said ends 5a and 5b together and prevent loss of said weights 4 or said damping fluid 10. In the preferred embodiment, said hoop collar is placed on the hoop with a crush vacuum seal. By creating a slight vacuum in said hoop, the device can be used at any altitude with any atmospheric pressure without adverse effects.

Said spherical weights 4 are sized so that they are free to move within the interior portion of said inner hoop layer 6. The free motion of said weights is damped by a quantity of said damping fluid 10. Sufficient damping fluid is added to cover a portion of the weights when the device is in use.

Figure 3:
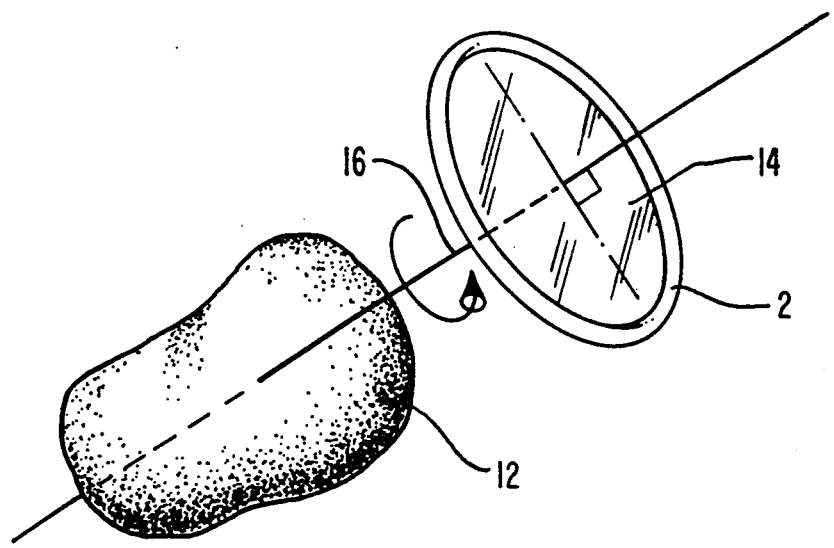
FIG. 3 depicts the proper orientation of an annular balancing hoop.

Said hoop 2 is adapted to be attached to a rotating object to be balanced. FIG. 3 illustrates the relative position of attachment of said hoop to a rotating object 12, not claimed. Said hoop is attached in a manner to be concentric with the axis of rotation 16 of the rotating object 12. For optimum results, said hoop 2 must be oriented relative to the rotating object 12 such that the plane of the hoop 14 is perpendicular to and centered on said axis of rotation 16 of the rotating object.

Figure 4:
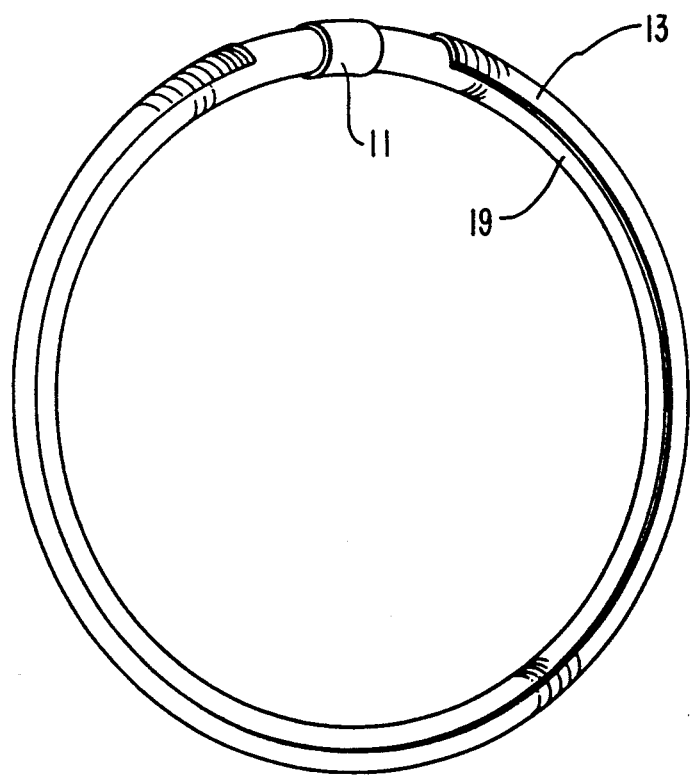
FIG. 4 depicts a balancing hoop assembly.
Figure 5:
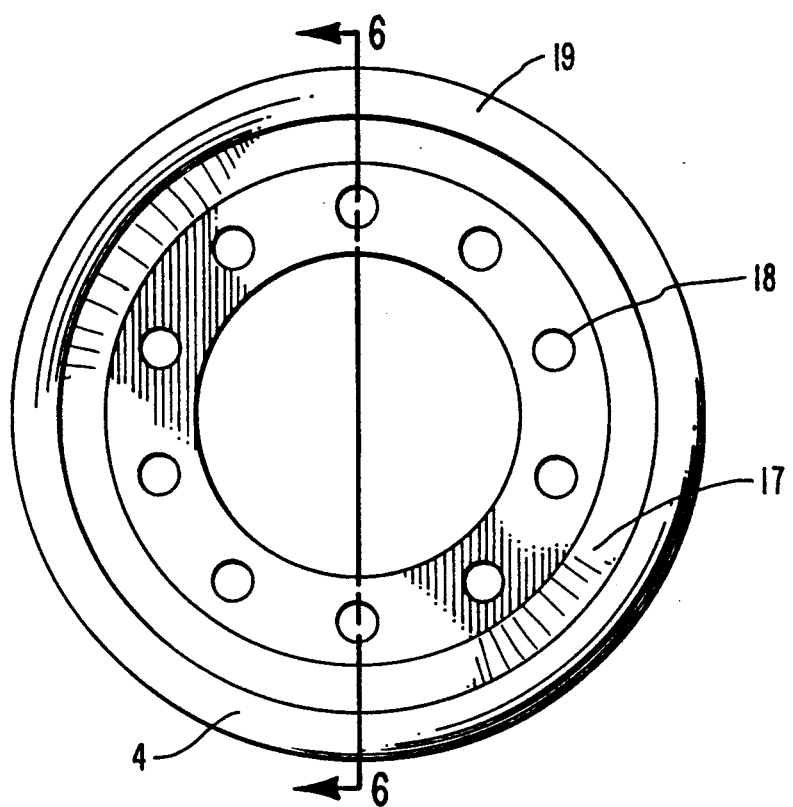
FIG. 5 depicts a balancing hoop mounting fixture.
Figure 6:
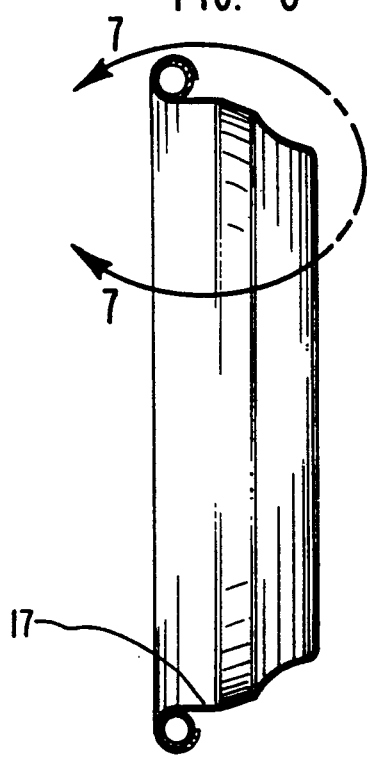
FIG. 6 depicts a side view of a mounting fixture.
Figure 7:
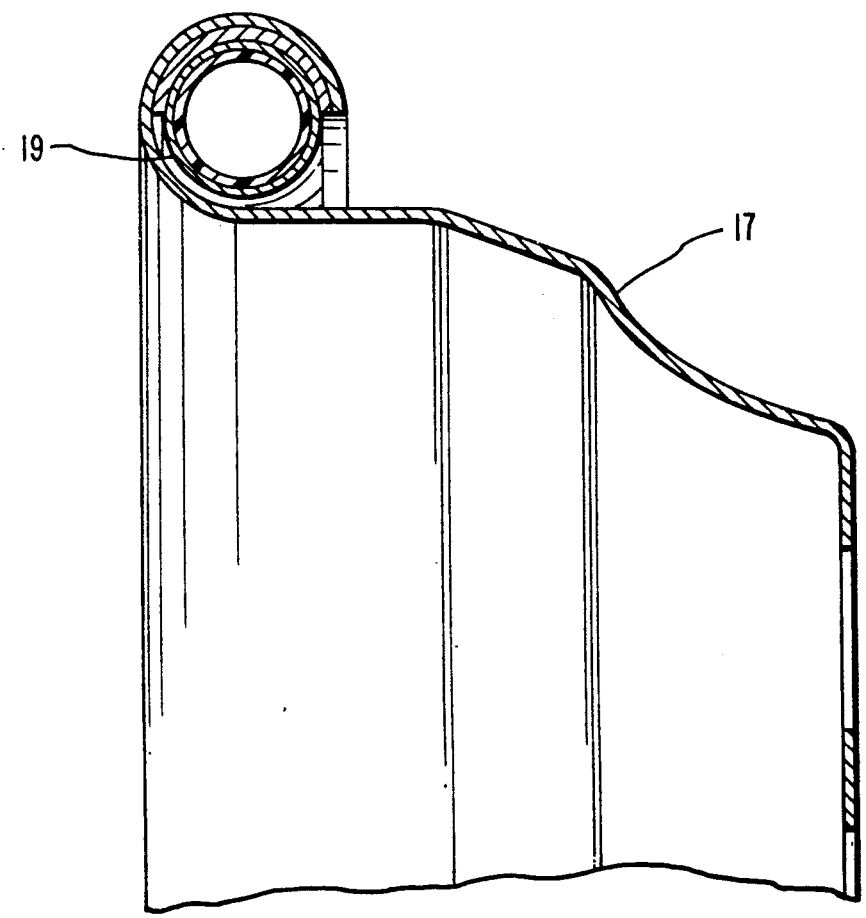
FIG. 7 depicts how a balancing hoop assembly is attached to a mounting fixture.

Said hoop 2 can be attached directly to a rotating object or it can be held by a mounting fixture attached to a rotating object. FIGS. 5, 6, and 7 show a mounting fixture 17 designed to facilitate the attachment of said hoop 2 to a vehicle wheel. FIG. 4 shows a jacket 13 that has the same thickness as said hoop collar 11. Said jacket 13 is mounted around the exterior of said hoop 2. Said jacket 13 is formed in an annular hoop shape and is sized to fit over the outside perimeter of said hoop 2. Said jacket has a semicircular profile which abuts against said hoop collar 11 (not shown). Placement of said jacket creates a smooth, uniform, outer perimeter on the collared and jacketed hoop. In the preferred embodiment, said jacket 13 is constructed of aluminum. The collared and jacketed hoop is a balancing hoop assembly 19. FIG. 5 shows a plan view of a mounting fixture 17 adapted to mount said balancing hoop assembly 19 to the wheel of a vehicle. In the depicted embodiment, the mounting fixture 17 has ten predrilled holes 18. These holes 18 have beveled edges and are sized and positioned to fit the wheel of a vehicle to be balanced. The mounting fixture 17 is placed on the wheel of a vehicle on the same lug bolts which hold the wheel. Lug nuts (not shown) are tightened onto the lug bolts. The beveled edges of said holes assist in centering said mounting fixture on the lug bolts by directing the mounting fixture holes to be centered over the lug bolts.

Figure 8:
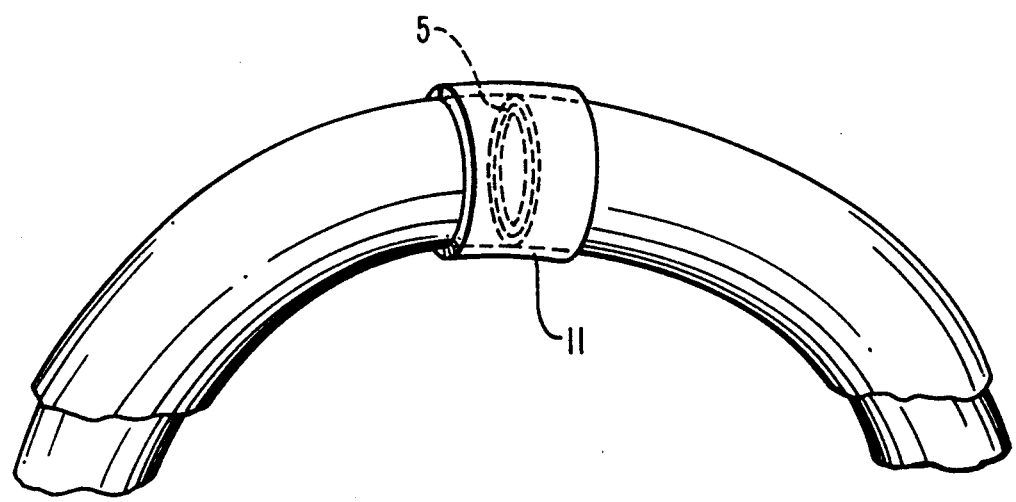
FIG. 8 depicts a hoop collar around the joined annular hoop ends.

FIG. 6 shows a side view of said mounting fixture 17. FIG. 7 shows said balancing hoop assembly 19 held in place on said mounting fixture 17. Balancing hoop assembly 18 is positioned within a lip on the outer perimeter of said mounting fixture 17. FIG. 8 depicts the abutted ends 5a and 5b inside hoop collar 11.

The preferred method of the fabrication of said balancing hoop assembly 19 yields a smooth, essentially seamless, and precisely circular interior region inside said hoop 2.

The preferred fabrication process comprises the steps described herein. A description of the fabrication process also describes the completed apparatus claimed herein. A first tube, inner hoop layer 6, of acrylonitrile-butadiene-styrene (ABS) tubing is inserted into a second tube, outer hoop layer 8, of extruded 6061T4 aluminum. Both hoop layers are of sufficient length so that when formed in a circle, the completed hoop is sized to fit the rotating object to be balanced or a mounting fixture. In one embodiment, said hoop layers are approximately 57.3" long to form a hoop to be used on a typical tractor-trailer wheel. Hoop layers of other lengths are necessary for different sized wheels such as those for most automobiles or for balancing shafts of rotating machinery. ABS plastic is used for the inner hoop layer in the preferred embodiment. ABS plastic absorbs vibrations and noise caused by movement of said weights 4 which is especially important during start-up of any vehicle or machine using the inventive device. ABS plastic is capable of insulating against static build-up since it is electrically insulating. Use of a plastic for inner hoop layer 6 eliminates the possibility of electrolytic corrosion between said weights and said outer hoop layer 8. ABS plastic also prevents transfer of electrolysis (generated by damping fluid turbulence) to said outer hoop layer 8. ABS plastic is also an effective thermal insulation against outside temperatures. In the prior art, little or no thermal insulation is provided by metal annular hoops. Other materials, including plastics, rubbers, and various synthetics could be used as a flexible inner hoop layer.

In the preferred embodiment, said inner hoop layer 6 has a 0.9 inch outside diameter, (O.D.), and 0.8 inch inside diameter, (I.D.). Said outer hoop layer 8 has an outside diameter of 1.0 inch and an inside diameter of 0.90 inch. In the preferred embodiment, said outer hoop layer 8 is constructed of 6061T4 extruded aluminum tubing. Other rigid materials could be used. Extruded aluminum provides many advantages. These advantages include its light weight. Extruded aluminum is resistant to rust, corrosion, solar rays and to many acids and bases. In addition, extruded aluminum has good formability. Its strength increases with cold working. Studies have shown that the tensile strength of extruded aluminum increases with age and lower temperatures.

The thicknesses of said inner hoop layer 6 and outer hoop layer 8 may be varied to achieve specific results and for uses on different pieces of equipment or for different vehicles. Said inner hoop layer 6 is fitted inside said outer hoop layer 8. Said hoop layers 6 and 8 are placed onto a precision tubing bender and formed into an annular hoop. This process is well known to those skilled in the art. Said hoops are then formed into the desired circular hoop size for the use determined by the manufacturer. Said hoop sizes will differ for uses on trucks, cars and rotating shafts for machinery. Said hoop 2 is then placed on a precisely sized pattern for the particular wheel, shaft or mounting fixture. Overlapping hoop ends are precisely cropped by use of a radial arm saw. The saw blade thickness must be taken into account to create a properly formed hoop which allows hoop ends to meet inside said hoop collar 11. Said hoop 2 is removed from the pattern and placed in a template to ensure that said hoop is a perfect circle. Next, a blast of high pressure air is blown through the formed hoop to remove any loose cuttings or particles from the interior of said hoop.

A plurality of counterweighting chrome steel balls 4 are placed into said hoop 2. The size and number of said weights 4 are dependent upon the inside diameter of said inner hoop layer 6 and the circumference of said hoop. In one embodiment 30 weights are used. The optimum number of balls to be used as weights is determined by the inventor using the following formula:

$$\text{No. Weights} = \frac{\pi[(OD_{oh}) + (ID_{oh})]}{2} \cdot \frac{(120/360)}{(ID_{ih})(.8)}$$

Where:
$OD_{oh}$ = the outside diameter of the outer hoop
$ID_{oh}$ = the inside diameter of the outer hoop
$ID_{ih}$ = the inside diameter of the inner hoop 120 degrees is the optimum value for the arc of the weights as determined by experimental use of the apparatus by the inventor.

Various numbers of said weights can be used without departing from the invention. The number, size and weight of said weights used in the invention provide for dynamic balancing at low speeds. This is a great advantage to drivers who may need to travel at slow speeds due to weather or other road conditions.

Said weights are sized to have a diameter which provides for free movement within said inner hoop layer 6. The diameter of said weights 4 should be greater than ½ the inside diameter of said inner hoop layer 6 to prevent wedging or jamming of said weights. In practice, said weights have a diameter which is in the range of 0.55 to 0.8 of the inner diameter of the inner hoop. This range may vary for very large applications of the inventive apparatus. In the preferred embodiment said weights 4 are made of chrome steel which has a value of 60-65 on the Rockwell C scale of hardness. The chrome steel balls are resistent to wear and erosion. Hardness of chrome steel helps prevent wear and chipping of the weights in use. Weights of high density (e.g. specific gravity 7.86) permits maximum counterweight balancing in the preferred circumferential arc of 120 degrees. This preferred circumferential arc is based upon the optimum test results achieved by the inventor. Thus, fewer weights are required to achieve the effects of balancing.

In a preferred embodiment, the specific gravity of the weight is 7.86. The diameter of the weights are 11/16 inches.

A quantity of damping fluid 10 is then introduced into said hoop 2. Sufficient damping fluid 10 is used to dampen movement of said weights 4 during rotation of said hoop when centripetal forces hold said weights 4 and damping fluid 10 against the outer circumference of said hoop's interior. The hoop should not be filled with damping fluid as this would decrease the efficiency of the movement of the weights. A sufficient quantity of damping fluid is any amount that partially emerses said weights in said damping fluid while the inventive device is in use. Different amounts of damping fluid can be used in different embodiments for uses with wheels of various sizes and on rotating machinery. In practice, said damping fluid, in combination with said weights will fill from one-fourth to three-fourths of said hoop.

In one embodiment, said damping fluid 10 is silicone fluid. In another embodiment, said damping fluid is mineral oil. The damping fluid may incorporate antioxidants, rust inhibitors, and metal deactivators. Antioxidants are added to retard any degradation of the damping fluid by oxygen in the damping fluid. Metal deactivators and rust inhibitors are added to prevent corrosion of said weights. Damping fluid containing additives is obtained from Century Oils (Canada) Inc. of British Columbia. Said additives to said damping fluid are trade secrets of and proprietary to Century Oils (Canada) Inc. and/or its suppliers. In the preferred embodiment, said damping fluid is inert to plastics such as the ABS plastic used for inner hoop layer 6. The preferred damping fluid is capable of being used over a wide temperature range. In the preferred embodiment, said damping fluid has a pour point of less than $-57°$ C. and a specific gravity of 0.892 at 15.6° C. The Kinematic viscosity of the preferred damping fluid is 10.65 cST at 40 degrees Celsius. Since it is difficult to change the damping fluid once the hoop is assembled and sealed, said damping fluid is a mixture which does not degrade over time.

Said hoop collar 11 is then placed over the ends 5a and 5b of said tube. Said hoop collar is constructed of sealant-treated 6061T4 aluminum and has a 1.125 inch O.D., a 1.0 inch I.D., and is 0.875" wide. Said hoop collar is of sufficient length to hold ends 5a and 5b together. In one embodiment, said hoop collar is approximately 3" long. Ends 5a and 5b are brought into contact with each other at the center of said hoop collar 11. Said hoop and hoop collar are placed in a vacuum collar press and vacuum crushed to seal said hoop. In the preferred embodiment, a vacuum seal is achieved inside the hoop. In the preferred embodiment a vacuum of 3% is achieved when sealing said hoop collar. The vacuum assists in increasing the effectiveness of the apparatus and makes it possible to use the apparatus at various altitudes without loss of effectiveness. Next, a jacket 13 is placed on said hoop. In one embodiment, said jacket is a ½ profile (semi-circular cross-sectioned) piece of 6061T4 aluminum. Aluminum is used for strength and durability. Its use is ideal for use on large heavy vehicles or machinery. In the case of small passenger vehicles or small machinery, the aluminum jacket can be replaced with an ABS plastic jacket or other material adapted to achieve additional sound insulation and noise reduction. Said jacket is 0.065 inches thick and is formed in a hoop with its concave face at the interior of said hoop 2. Said jacket is sized in length to fit said hoop and not overlap said hoop collar. For different applications, said jacket will be different lengths to form a continuous outer perimeter when brought into contact with both ends of said hoop collar. Thus, the outside perimeter of said hoop from collar edge to collar edge has a uniform outside diameter when said jacket is in place. Said jacketed hoop is a balancing hoop assembly 19. Due to the weight and dimensions of said hoop collar, a jacket is desirable to balance the balancing hoop assembly 19.

Said hoop 2 with jacket 13 is then placed on said mounting fixture 17. In the preferred embodiment, said mounting fixture is a dish. Said mounting fixture 17 has a lip 20 sized to accept said balancing hoop assembly 19. Said balancing hoop assembly 19 and said mounting fixture 17 are then placed on a double direction high speed rotary press. Said lip 20 is folded tightly over said balancing hoop assembly, thus enclosing it into said mounting fixture. The rotary press comprises a table which spins at a rate of 5100 rpm. Said balancing hoop assembly is placed on the rotary press. Four preformed, free-wheeling, centrifugal rotary wheels set at 90° apart on a true plane are part of the rotary press. Said wheels spin at a rate of 5100 rpm in the opposite direction of said rotary press table. The wheels are brought into contact with said lip 20 thus folding it over said balancing hoop assembly. The wheels are used to securely fold said lip 20 of the mounting fixture over said balancing hoop assembly. Use of rotary press insures concentricity of the hoop in the mounting fixtures.

Said mounting fixture is an aluminum dish with predrilled holes 18 in the preferred embodiment. Said dish has holes drilled and sized to fit the lug nut configuration for the wheel on which it is to be used. Said predrilled holes are beveled at the edges to allow for self-centering as the dish is attached to the wheel by means of the lug nuts. The self-centering feature assists in making the device concentric to the axis of rotation. The self centering bevels of said holes are similar to the arrangement currently used on wheels with predrilled holes for lug bolts. The use of beveled holes on automobile wheels for use with lug bolts and lug nuts is known to those skilled in the art.

Constructing said hoop 2 from two layers of materials allows for different properties to be achieved for the exterior of the hoop and the interior of the hoop. The aluminum exterior, (outer hoop layer 8) is strong and resistant to corrosion and erosion. A rigid outer hoop layer also provides for protection against shocks to the hoop assembly. A rigid outer hoop layer prevents said hoop assembly from deforming when in use at high speeds. A metal outer layer hoop can also be treated to be corrosion resistant and wears better with age. The interior of said hoop (inner hoop layer 6) is necessary to absorb vibration. A flexible inner hoop layer is included to provide good thermal insulation not provided by a metal hoop. The plastic inner hoop layer also reduces noise caused by the movement of the weights below critical speed. The plastic inner hoop layer is inert to chemical reactions with the weights. Use of some type of inner hoop layer is necessary to prevent wear caused by metal weights coming into constant contact with a metal outer hoop layer. Inner hoop layer 6 also provides a good seal for the use of a damping fluid. The inner hoop layer is also useful in absorbing shocks to the assembly.

Said weights are chrome steel balls in the preferred embodiment. The hardness and smoothness of the surface of said weights helps to prevent chipping and pitting. Use of chrome steel balls ensures smoother ball movement within said hoop 2 and longer life of the inventive apparatus. The weights used in the preferred embodiment are chemically inert and provide a long life, corrosive resistant weight.

A damping fluid 10 with a pour point of below $-57°$ C. for the mineral oil (or $-83°$ for a silicone fluid) permits operation of the inventive apparatus in the most extreme weather conditions worldwide. Anti-oxidants may be included in said damping fluid 10 to inhibit decomposition of said damping fluid with age. Said damping fluid may be fortified with metal deactivators and rust inhibitors to minimize reaction with metal materials. In this way the life of the inventive apparatus is greatly enhanced. Said damping fluid is a viscous fluid which is not substantially altered under the influence of thermal cycling and prolonged, agitation. In the preformed embodiment, said damping fluid 10 is a non-toxic.

While certain embodiments of the present invention have been illustrated and described herein, the invention is not to be limited to the specific forms or arrangements shown. Various modifications and applications may occur to those skilled in the relevant art without departing from the true spirit and scope of the invention as defined by the appended claims.

I claim:

1. A dynamical balancing device for balancing rotating objects, said balancing device operating continually while the object is in rotation, comprising:
   a) an annular hoop with a hollow circular cross section further comprising a rigid outer hoop layer and a flexible inner hoop layer; and
   b) a plurality of spherical weights confined to the interior of said annular hoop wherein said weights are free to move relative to said annular hoop; and
   c) a quantity of damping fluid contained in the interior of said annular hoop; and
   d) a means for attaching said annular hoop to a rotating object such that the plane of said annular hoop is perpendicular to the axis of rotation of said object and said annular hoop is concentric with the axis of rotation of said object.

2. A balancing device in accordance with claim 1 wherein said outer hoop layer is sealed with a collar.

3. A balancing device in accordance with claim 1 wherein said outer hoop layer is resistent to corrosion and erosion.

4. A balancing device in accordance with claim 3 wherein said outer hoop layer is made of metal.

5. A balancing device in accordance with claim 4 wherein said outer hoop layer is made of Aluminum.

6. A balancing device in accordance with claim 1 wherein said inner hoop layer is adapted to be electrically insulating.

7. A balancing device in accordance with claim 1 wherein said inner hoop layer is adapted to reduce noise and vibration of said weights.

8. A balancing device in accordance with claim 7 wherein said inner hoop layer is made of acrylonitrile-butadiene-styrene.

9. A balancing device in accordance with claim 1 wherein said means for attaching said annular hoop is a dish.

10. A balancing device in accordance with claim 9 wherein said dish is adapted to attach to a rotating object by use of predrilled holes.

11. A balancing device in accordance with claim 9 wherein said annular hoop is attached to said dish by means of a double direction rotary press.

12. A balancing device in accordance with claim 9 wherein said dish is made of metal.

13. A balancing device in accordance with claim 1 wherein said weights are chrome steel.

14. A balancing device in accordance with claim 1 wherein said weights have a diameter greater than ½ the inner diameter of said inner hoop layer.

15. A balancing device in accordance with claim 1 wherein said damping fluid is mineral oil.

16. A balancing device in accordance with claim 15 wherein said damping fluid further comprises antioxidant additives.

17. A balancing device in accordance with claim 15 wherein said damping fluid further comprises metal deactivators.

18. A balancing device in accordance with claim 15 wherein said damping fluid further comprises rust inhibitors.

19. A balancing device in accordance with claim 15 wherein said damping fluid further comprises (a) antioxidant additives, (b) metal deactivators and (c) rust inhibitors.

20. A balancing device in accordance with claim 1 wherein said damping fluid comprises a silicone based fluid.

21. A balancing device in accordance with claim 20 wherein said damping fluid further comprises antioxidant additives.

22. A balancing device in accordance with claim 20 wherein said damping fluid further comprises metal deactivators.

23. A balancing device in accordance with claim 20 wherein said damping fluid further comprises rust inhibitors.

24. A balancing device in accordance with claim 20 wherein said damping fluid further comprises (a) antioxidant additives, (b) metal deactivators and (c) rust inhibitors.

25. A balancing device in accordance with claim 1 further comprising a jacket.

26. A balancing device in accordance with claim 2 further comprising a jacket.

27. A balancing device in accordance with claim 4 further comprising a jacket.

28. A balancing device in accordance with claim 5 further comprising a jacket.

29. A balancing device in accordance with claim 9 further comprising a jacket.

30. A balancing device in accordance with claim 12 further comprising a jacket.

31. A dynamic balancing device for balancing rotating objects, said balancing device operating continually while the object is in rotation comprising:
   a) an annular hoop with a hollow circular cross section further comprising a rigid outer hoop layer and a flexible inner hoop layer; an
   b) a plurality of spherical weights confined to the interior of said annular hoop wherein said weights are free to move relative to said annular hoop and further wherein said weights have a diameter greater than ½ the inner diameter of said inner hoop layer; and c) a quantity of damping fluid contained in the interior of said annular hoop; and
d) a means for attaching said annular hoop to a rotating object such that the plane of said annular hoop is perpendicular to the axis of rotation of the object and said annular hoop is concentric with the axis of rotation of the object; and
e) a hoop collar; and
f) a jacket; and
g) wherein said means for attaching said annular hoop is a dish.

32. A balancing device in accordance with claim 31 wherein,
a) said inner hoop layer is plastic and
b) said outer hoop layer is metal.

33. A balancing device in accordance with claim 31 wherein said weights are chrome steel.

34. A balancing device as in claim 31 wherein said dish is adapted to attach to a rotating object by the use of predrilled holes.

35. A balancing device in accordance with claim 31 wherein said damping fluid further comprises antioxidants additives and rust inhibitors.

36. A method for manufacturing a balancing device comprising a two-layered annular hoop and means for attaching said hoop to a rotating object comprising:

a) a step of inserting an inner hoop layer into an outer hoop layer; and
b) a step of inserting said inner hoop layer and outer hoop layer into a tubing bender; and
c) a step of bending said inner hoop layer and outer hoop layer into a circle to form an annular hoop; and
d) a step of inserting weights into said annular hoop;
e) a step of adding a quantity of damping fluid to said annular hoop;
f) a step of sealing said annular hoop;
g) a step of securing said annular hoop onto a mounting fixture.

37. A method for manufacturing as in claim 36 further comprising a step of cutting said annular hoop ends squarely.

38. A method for manufacturing as in claim 36 wherein said step of sealing said annular hoop comprises placing a collar on said annular hoop.

39. A method for manufacturing as in claim 36 wherein said step of securing said annular hoop is done on a double direction rotary press.

40. A method of manufacturing as in claim 39 further comprising a step of placing a jacket around said annular hoop.

* * * * *